(No Model.)
G. H. CROSBY.
TRAP FOR STEAM PRESSURE GAGES.
No. 288,693. Patented Nov. 20, 1883.
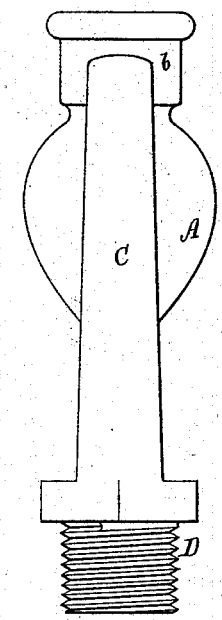
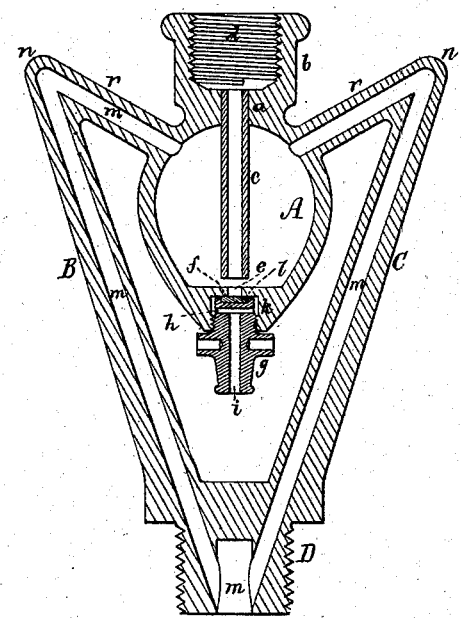
Witnesses.
S. N. Piper
E. B. Pratt
Inventor,
Geo. Hannibal Crosby.
by R. H. Eddy atty.

UNITED STATES PATENT OFFICE.

GEORGE HANNIBAL CROSBY, OF SOMERVILLE, MASSACHUSETTS.

TRAP FOR STEAM-PRESSURE GAGES.

SPECIFICATION forming part of Letters Patent No. 288,693, dated November 20, 1883.

Application filed October 17, 1883. (No model.)

*To all whom it may concern:*

Be it known that I, GEORGE HANNIBAL CROSBY, of Somerville, in the county of Middlesex, of the Commonwealth of Massachusetts, have invented a new and useful Improvement in Traps for Steam-Pressure Gages; and I do hereby declare the same to be described in the following specification, and represented in the accompanying drawings, of which—

Figure 1 is a front elevation, and Fig 2 a longitudinal section, of a trap of my invention, the nature of which is defined in the claim hereinafter presented.

This trap is for use with a steam-pressure gage, and is to prevent the steam from a boiler from entering the curved expansion-tube of the gage, though causing water to be forced therein, it being well known that the steam injures the expansive tube or makes it erroneously act to indicate the pressure of the steam.

In this trap A is a steam-condensing vase, having extending downward within it, nearly to its bottom, and from a partition, $a$, across the neck $b$ of the base, a tube, $c$, such tube opening through such partition. The neck is screw-threaded, as shown at $d$, to fix it to the induct of a pressure-gage. The vase at its bottom has an educt, $e$, there being at the lower end of such educt a valve-seat, $f$. A plug, $g$, provided with passages $h$ and $i$, arranged in it, as shown, is screwed upward within the bottom of the vase, and into a chamber, $k$, below the valve-seat, such plug serving to press a disk-valve, $l$, upward against the seat. On unscrewing the plug, any water that may be in the vase may be discharged therefrom through the educt $e$ and the passages $h$ and $i$. The plug and vase and the educt and valve-seat constitute a cock for discharge of such water. For such an ordinary cock screwed into the bottom of the vase might be substituted. The vase thus made is supported by two bent arms, B and C, extending, as shown, from the body and downward to a screw, D, for connecting the trap to a steam-boiler or a conduit leading therefrom. The screw has a hole or passage, $m$, extending through it, and one on each of the arms and into the interior of the vase. Each arm B and C has its shorter or upper portion, $r$, inclined downward to the body of the vase, as shown. This feature is important, because in such case the said part $r$ of the arm holds in practice, with the vase, water, and thus prevents vaporization of the water in the vase by the steam. If the arms are made to open into the vase at its lower part instead of the upper, as shown, the partition $a$ and tube $c$ can be dispensed with. Steam passing through the passage $m$ into the vase will be condensed in the latter about the tube $c$, and also in the part $r$ of each arm. Water thus produced in the vase will be driven by the steam up the tube and into the expansion-tube of the pressure-gage. As each arm, as represented, is bent or formed with an acute angular bend, as shown at $n$, and is straight from the vertex thereof to the vase, either of the arms can be easily cored or bored in order to form in it the passage $m$. It is not essential that each arm should have an acute angular bend, such being useful when it may be desirable to form the passage $m$ with a boring-tool. Each arm may be bent with a curve; but the part of each that projects inward toward the vase should descend or incline downward relatively thereto.

I claim—

The gage-trap, substantially as described, consisting of the necked vase and the connection-screw and bent arms, arranged and provided with a passage leading through such screw and one or each of the said arms and into the vase, all being essentially and to operate as specified.

GEORGE HANNIBAL CROSBY.

Witnesses:
R. H. EDDY,
E. B. PRATT.